Patented Apr. 24, 1945

2,374,427

UNITED STATES PATENT OFFICE 2,374,427

METHOD OF MAKING HOMOGENIZED MILK PRODUCTS

Ernest D. Fear, Kansas City, Mo., assignor of thirty percent to Irving E. Fear and 20 percent to Helendoris Murphy, both of Kansas City, Mo.

No Drawing. Application March 6, 1940, Serial No. 322,510

6 Claims. (Cl. 99—54)

My invention relates to a method of making homogenized milk products and more particularly homogenized milk and buttermilk.

Many undesirable changes occur in milk containing milk fat. These changes produce an "off" taste in the milk variously termed "rancid," "tallowy," and "fishy."

Milk fat contains a relatively high percentage of the lower fatty acids. Upon slight hydrolysis of these, the result is splitting and the formation of aldehydes, acids, and ketones producing tallowy odors and flavors. The production of free fatty acids is due primarily to the hydrolytic action of enzymes or the action of free acids in the presence of water. This accelerating effect of free acids appears to be analogous to their action in the acid hydrolysis of sugars and is a function of the hydrogen ion concentration. The lower fatty acids such as butyric, caproic and the like, produced by hydrolysis, are responsible for the rancid odors and flavors.

Homogenized milks are well known to the art. In homogenization, milk is forced, under high pressure, through small orifices to produce a colloidal suspension of the butter fat. In homogenized milks, the cream does not rise to the top and, in infant feeding, softer curds are produced.

Homogenized milks are popular but their keeping qualities are exceedingly poor. Probably the reason for this is that the homogenization process disseminates the bacteria so well throughout the milk and so finely divides the butter fat content that the conditions are conducive to a rapid bacteria growth. Tests have shown that the bacteria count made immediately after homogenization is very much greater.

One object of my invention is to provide a homogenized milk of increased keeping qualities.

Another object of my invention is to produce a homogenized milk of superior flavor.

Another object of my invention is to provide a method of producing a superior buttermilk.

Other and further objects of my invention will appear from the following description.

In carrying out my process, the milk is pasteurized and then neutralized by the addition of an agent selected from a class consisting of calcium oxide and magnesium oxide. After neutralization, the milk is homogenized. To the homogenized milk, if a sweet milk is to be produced, a sufficient amount of a standardized starter is added to bring the acidity of the milk to a point between .10 and .13, as determined by the Nafis tester. The milk is then cooled and my homogenized milk will keep for long periods of time.

The mass inoculation of the milk with a specially prepared starter seems to have an inhibitory effect on the undesirable organisms which might be present in the milk. A complete understanding of the relationships involved is extremely difficult. One must consider that the quantity of undissociated lactic acid added produces a lower pH which, while not necessarily inhibitory to gas-producing or putrefactive organisms, nevertheless reduces their activity.

If a buttermilk is to be made, a sufficient amount of the starter is added to bring the acidity of the milk to between .65 and .85 as determined by the Nafis acidity tester. It is not necessary to add a sufficiently large quantity of starter to immediately bring the acidity to this point. To the homogenized milk a quantity of starter may be added and the acidity may be allowed to develop. When it has reached the desired point, the milk may be cooled. By means of my method, an improved buttermilk having a uniform aroma flavor is produced.

The starter to be employed is preferably one produced by the method of my invention, namely by pasteurizing the milk, then neutralizing undesirable acids by means of calcium oxide or magnesium oxide, and then adding any suitable lactic acid-producing culture.

It will be seen that I have accomplished the objects of my invention. I have provided a novel method of making homogenized milk and buttermilk, which products have improved keeping qualities and are of uniform excellence and flavor.

It will be understood, of course, that the neutralization step and the pasteurization step may be practiced simultaneously.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. A method of making homogenized milk including the steps of pasteurizing the milk, neutralizing the milk with an agent selected from the class consisting of calcium oxide and magnesium oxide, homogenizing the milk so treated, adding a lactic acid-producing starter, and then cooling the milk.

2. A method of making homogenized milk including the steps of pasteurizing the milk, neutralizing the milk with an agent selected from the class consisting of calcium oxide and magnesium oxide, homogenizing the milk so treated, adding a lactic acid-producing starter in an amount sufficient to bring the acidity of the homogenized milk to a point between .10 and .13 as determined by the Nafis acidity tester, and then cooling the milk.

3. A method of producing a homogenized buttermilk including the steps of pasteurizing the milk, neutralizing the milk with an agent selected from the class consisting of calcium oxide and magnesium oxide, homogenizing the milk so treated, adding a lactic acid-producing starter, permitting a sufficient quantity of lactic acid to develop to bring the acidity of the buttermilk to a point between .65 and .85 as determined by the Nafis acidity tester, and then cooling the milk.

4. A homogenized milk prepared by pasteurizing milk, neutralizing the milk by means of an agent selected from a class consisting of calcium oxide and magnesium oxide, homogenizing the pasteurized neutralized milk and then bringing the acidity of the milk to the desired point by means of a lactic-acid producing starter.

5. A homogenized milk as in claim 4 in which said starter is prepared by pasteurizing and neutralizing milk by means of an agent selected from a class consisting of calcium oxide and magnesium oxide, and inoculated with a desired lactic acid-producing organism.

6. A method as in claim 1 in which the lactic acid-producing starter is prepared by pasteurizing and neutralizing milk by means of an agent selected from a class consisting of calcium oxide and magnesium oxide, and inoculated with a desired lactic-acid producing organism.

ERNEST D. FEAR.